Oct. 23, 1956 A. W. NOON 2,767,982
ALIGNING MECHANISM
Filed Nov. 27, 1953 4 Sheets-Sheet 1

ALONZO W. NOON
INVENTOR.

BY Lyon & Lyon
ATTORNEYS

Oct. 23, 1956 A. W. NOON 2,767,982

ALIGNING MECHANISM

Filed Nov. 27, 1953 4 Sheets-Sheet 2

ALONZO W. NOON
INVENTOR.

BY Lyon & Lyon
ATTORNEYS

ALONZO W. NOON
INVENTOR.

BY Lyon & Lyon
ATTORNEYS

Oct. 23, 1956 A. W. NOON 2,767,982

ALIGNING MECHANISM

Filed Nov. 27, 1953

4 Sheets-Sheet 4

ALONZO W. NOON
INVENTOR.

BY Lyon & Lyon

ATTORNEYS.

2,767,982

ALIGNING MECHANISM

Alonzo W. Noon, Menlo Park, Calif.

Application November 27, 1953, Serial No. 394,565
5 Claims. (Cl. 271—59)

This invention relates to apparatus for aligning by one edge sheets of flexible material, such as paper and the like.

For the purposes of processing sheets of flexible material such as cards, checks, and the like, it oftentimes becomes necessary to remove the cards singly from a stack, place them in a sequence, and align them so that subsequent operations to be performed on these cards can occur with a minimum of variation in order that differences in position on these cards be minimized. This may be a requirement where the accurate location of the printing or perforation of these items is important. Also, in a system of the type wherein information in a coded form is placed within a given area upon cards and it is desired to subsequently pass these cards by a reading station, the cards must be fed singly to this reading station and with an accurate alignment, so that the information in the given area of each card may be read with a minimum of difficulty from each one of them.

Accordingly, an object of this invention is to provide a mechanism which enables the accurate alignment of sheets of flexible material.

Another object of this invention is to provide mechanism for rapidly separating such sheets from a stack and then accurately aligning them for purposes of subsequent operation.

Still a further object of the present invention is to provide novel and useful mechanism for feeding and aligning sheets of flexible material for a subsequent operation.

These and other objects of the invention are achieved by apparatus which picks up, one at a time, the sheets of flexible material from a stack, and delivers them to a mechanism which urges each one of the sheets toward a fixed edge so that the sheets are aligned by means of this fixed edge. They are then passed to a drive belt, where any remaining small aligning correction is made if needed. The drive belt then carries the sheets to the following processing equipment.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which Figure 1 is a view in side elevation of an embodiment of the present invention;

The apparatus, which is employed herein for separating the sheets or cards from a stack which is in the form of a rotating drum with a means for providing a first low-pressure area for elevating one end of the top card of a stack toward the periphery of a drum and perforations in the periphery of the drum whereby a vacuum is applied to hold the so-elevated card to the drum periphery so that it can be carried to the aligning mechanism, is fully described and claimed in an application for an Automatic Separating System filed November 9, 1953, Serial Number 390,897 and is also by this applicant.

Figure 1:
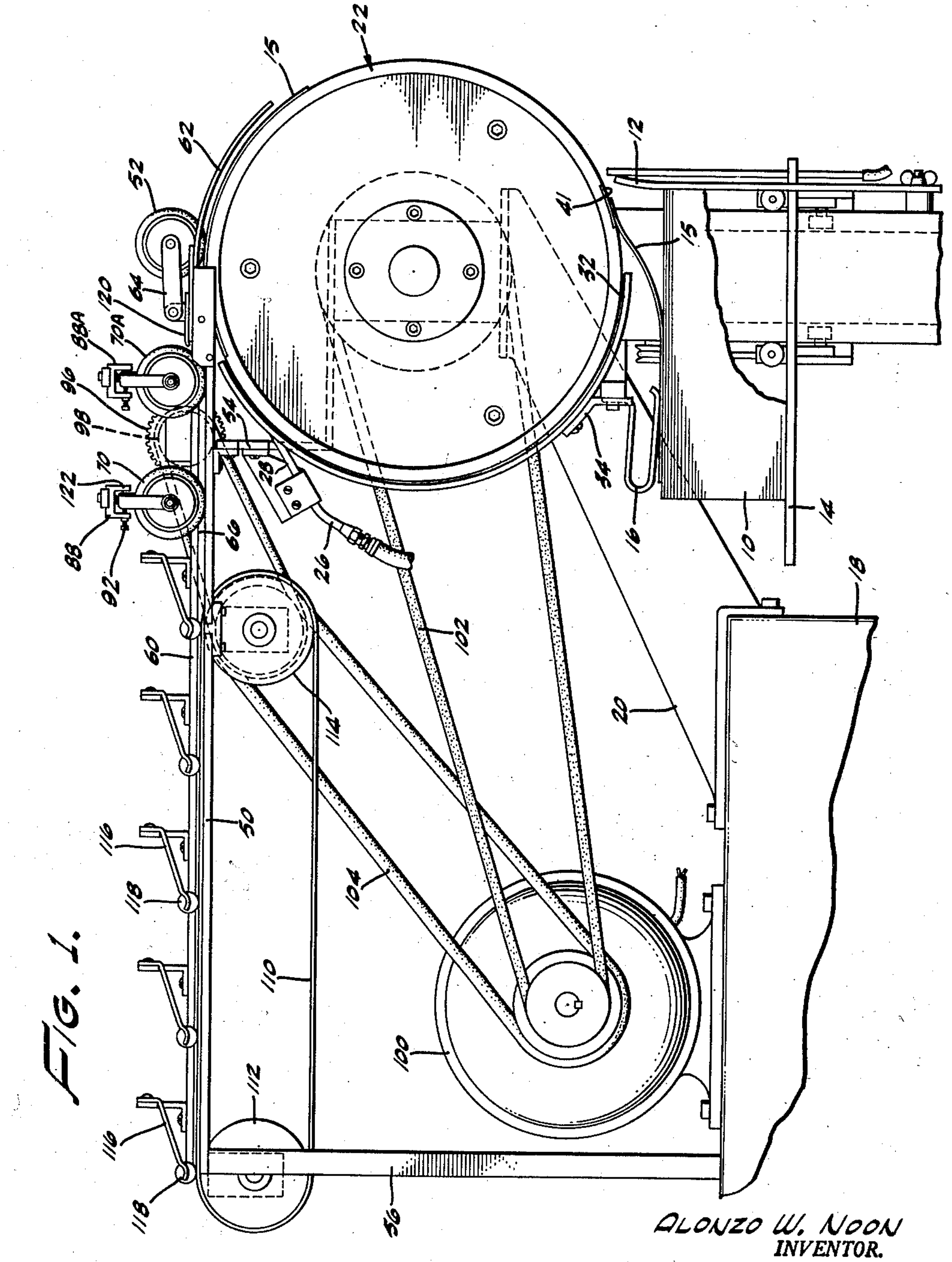

Reference is now made to Figure 1 of the drawing showing a side view of this invention. A stack of sheets 10, aligned at one end by a stop plate 12, is carried by an elevator 14 to be in pressing contact with a tensioning spring 16. The elevator 14 consists of a platform attached by cords to weights which are suspended on the other side of two pulleys. This elevator mechanism is not a part of this invention and is merely shown by way of example of apparatus for maintaining the sheets 10 in pressing contact with the tensioning spring 16, even though the top sheets are being continuously removed therefrom. Any suitable mechanism may be used for this purpose in place of the one shown. A base 18 carries thereon a supporting arm 20, upon which is rotatably mounted a drum 22. This drum is also shown in cross section in Figure 3, and Figures 2 and 3 should be considered in connection with the description of Figure 1.

A groove 24 extends around the periphery of the drum. A pipe 26 has an end portion 28 bent around and within the groove on the periphery of the drum. A compressor pump (not shown) is coupled to the other end and applies air under pressure to the pipe. The bent end portion 28 terminates within the groove or slot 24 of the drum at a location substantially near and above one end of the stack of cards 10. At the end of the pipe in the groove is a small deflecting plate 30 which serves to direct the air stream emanating from the pipe upward against the bottom of the slot. A guard plate 32 is spaced from the drum and extends from the bottom side of the drum around and almost to the top of the drum. A bracket 34, which supports the guard plate, is supported in turn from the supporting arm 20 holding the drum and also serves to support the tensioning spring 16.

Figures 3, 4, 5:
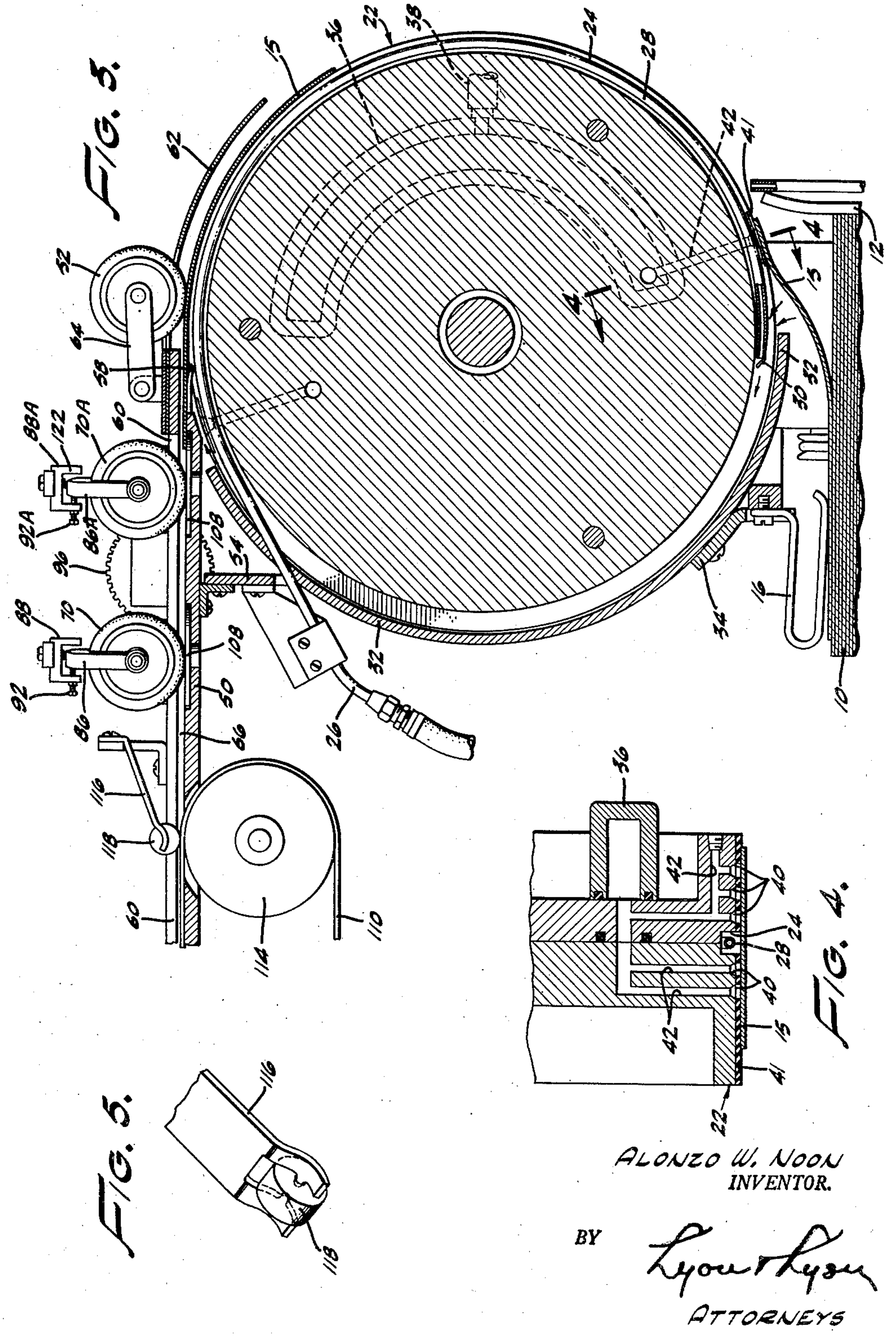
Figure 3 is a view taken along the line 3—3 in Figure 2 showing details of the feeding drum and aligning mechanism.
Figure 4 is a section of the feeding drum and valve along the line 4—4 in Figure 3.
Figure 5 is a detail of a roller used to maintain a sheet being aligned in contact with a drive belt.

The drum 22 has in pressing contact against one side thereof an arcuate valve 36. An air hose 38 is led to this arcuate valve to provide a vacuum therein. Referring to Figure 4, a cross section of the valve 36 is shown. In cross section it resembles a rectangle with an open side in pressing and sliding contact with the side walls of the drum. Openings 40 are drilled in the periphery of the drum, and by means of a passageway 42 these openings communicate with the arcuate valve when the periphery of the drum passes through the arc which this valve encompasses. As shown in cross section, in Figure 4, the drum may be made in two parts, which are then fastened together, in order to facilitate its fabrication. Accordingly, when the openings 40 in the periphery of the drum are passing through the arc described by the arcuate valve 36 the vacuum within the valve is communicated to the peripheral openings. This vacuum, however, is broken when the peripheral openings pass from the arc of the valve.

The type of valve described is exemplary. Other known types of valves may be employed for communicating a vacuum to the peripheral openings over a portion of their travel such as one communicating from a hollow hub of the drum.

To illustrate the operation of the mechanism thus far, let us consider a stack of cards 10. The stack is placed upon the elevating table 14, which serves to carry them upwardly until they are pressing against the tension spring 16. Air at approximately 10 pounds per square inch pressure, for example, is supplied by a pump to the air line, which has its nozzle ending in the groove of the drum. This air flow creates a low-pressure area above the portion of the uppermost card 15 between the guard 32 and the stop plate 12, which causes the end portion of the card to rise so that it bears against the drum. It remains in this position, sliding on the drum which is rotating, until a set of suction holes 40 pass over the portion of the card 15 which is sliding on the drum. Due to the positioning of the arcuate valve, at this time, a vacuum is applied to the suction holes and the end of the card is then pulled tightly against a pad of rubber 41 or similar material which covers the portion of the drum in the vicinity of these peripheral holes. As the drum revolves, the card is pulled from the stack and carried around to the top. At this position the arcuate valve is ended and suction is no longer applied to the peripheral holes. Thus the card 15 is released.

It then proceeds to the subsequent aligning mechanism. It should be noted that, since the drum is continuously rotating and since air is supplied continuously to the air line, the next card in the stack will be elevated against the drum as soon as the preceding card is pulled out of the way. Then when the suction holes rotate around to the proper point, the next card in the stack is grasped and carried upward to the succeeding aligning operation. In this way, a spaced relationship is maintained between cards as determined by the distance travelled by the suction holes around the drum between the release of a card picked up and the picking up of the next card. This may be modified by using more than one set of suction holes if desired or altering the drum size.

It should be noted, also, that a portion of the air issuing from the air line 28 is carried on around the drum by the guardplate 32. This air issues between the top of the drum and a bedplate 50 and thus functions to prevent cards from jamming into the space between the drum and bedplate. An idler wheel 52 which rides over the groove 24 in the drum functions to press down the leading edge of an advancing card 15 against the drum. It thus assists in guiding the card into the following aligning mechanism and also serves to maintain some driving force on the card by means of its downward pressure against the rotating drum.

The bedplate 50 of the aligning mechanism is supported at the drum end by means of a bracket 54 so that its upper surface is horizontal and slightly below the top of the drum. The underside of the bedplate is bevelled to allow fitting to the drum with small clearance. It should be noted that the bracket 54 which supports the drum end of the bedplate is supported from the supporting arm 20 which also rotatably supports the drum. The other end of the bedplate is supported by a second bracket 56 mounted on the base 18. A small finger 58 shown in Figure 3 extends from the end of the bedplate and then bends into the groove 24 on the drum. The finger 58 serves to lift the card 15 from the drum on to the bedplate. Projecting outwardly from the end of the bedplate 50 and mounted on a guide plate 60 is a deflector plate 62. The idler wheel 52 is mounted by means of a hinged arm 64, has a rubber tire and projects on to the drum through a slot in the deflector plate 62. As may be seen in Figure 2, the guide plate extends across the width of the bedplate 50 where the deflector plate 62 is attached and extends along the length of the bedplate with a constantly reducing width.

Figure 2:
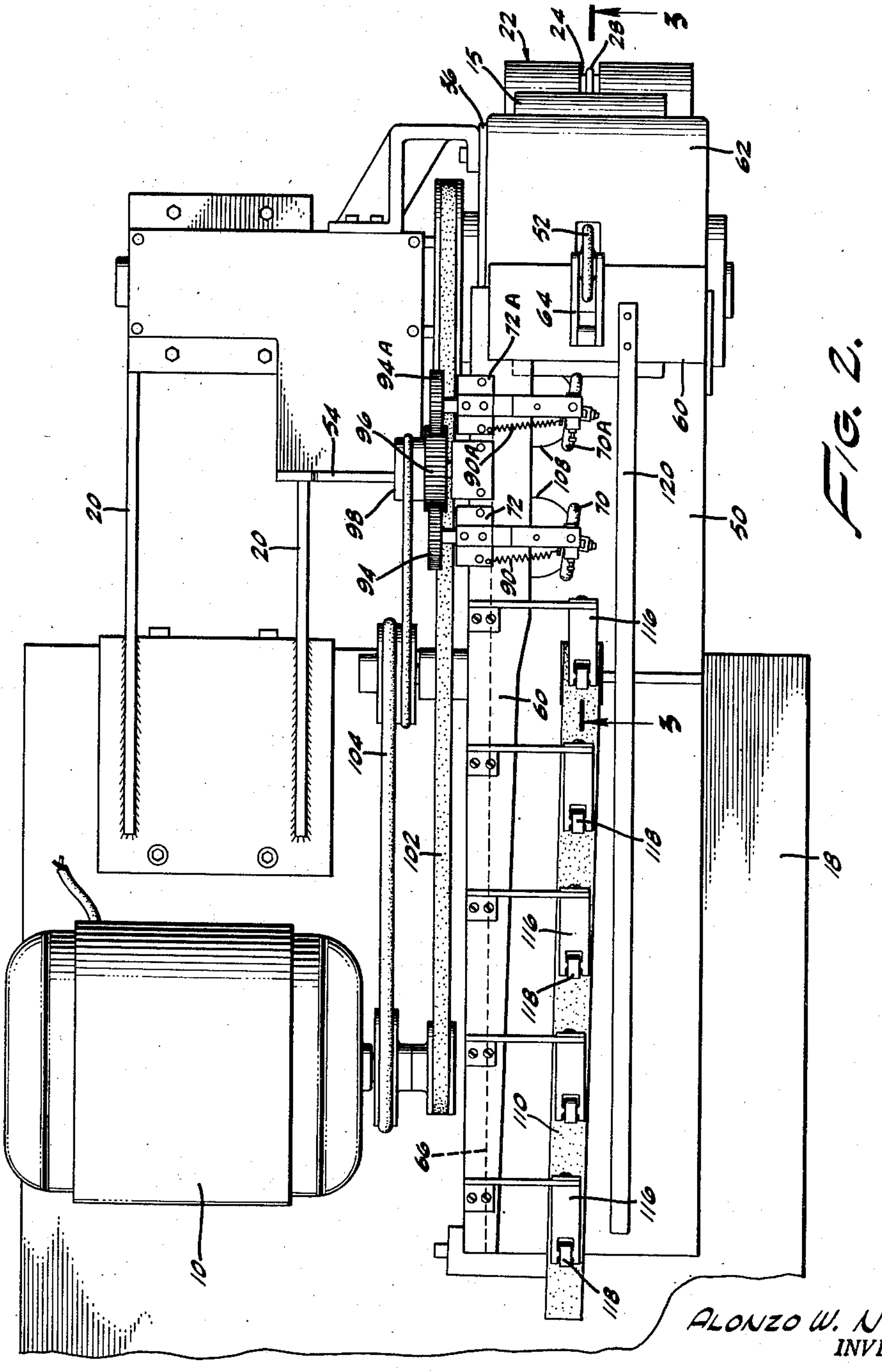
Figure 2 is a plan view of an embodiment of this invention.
Figures 6, 7, 8:
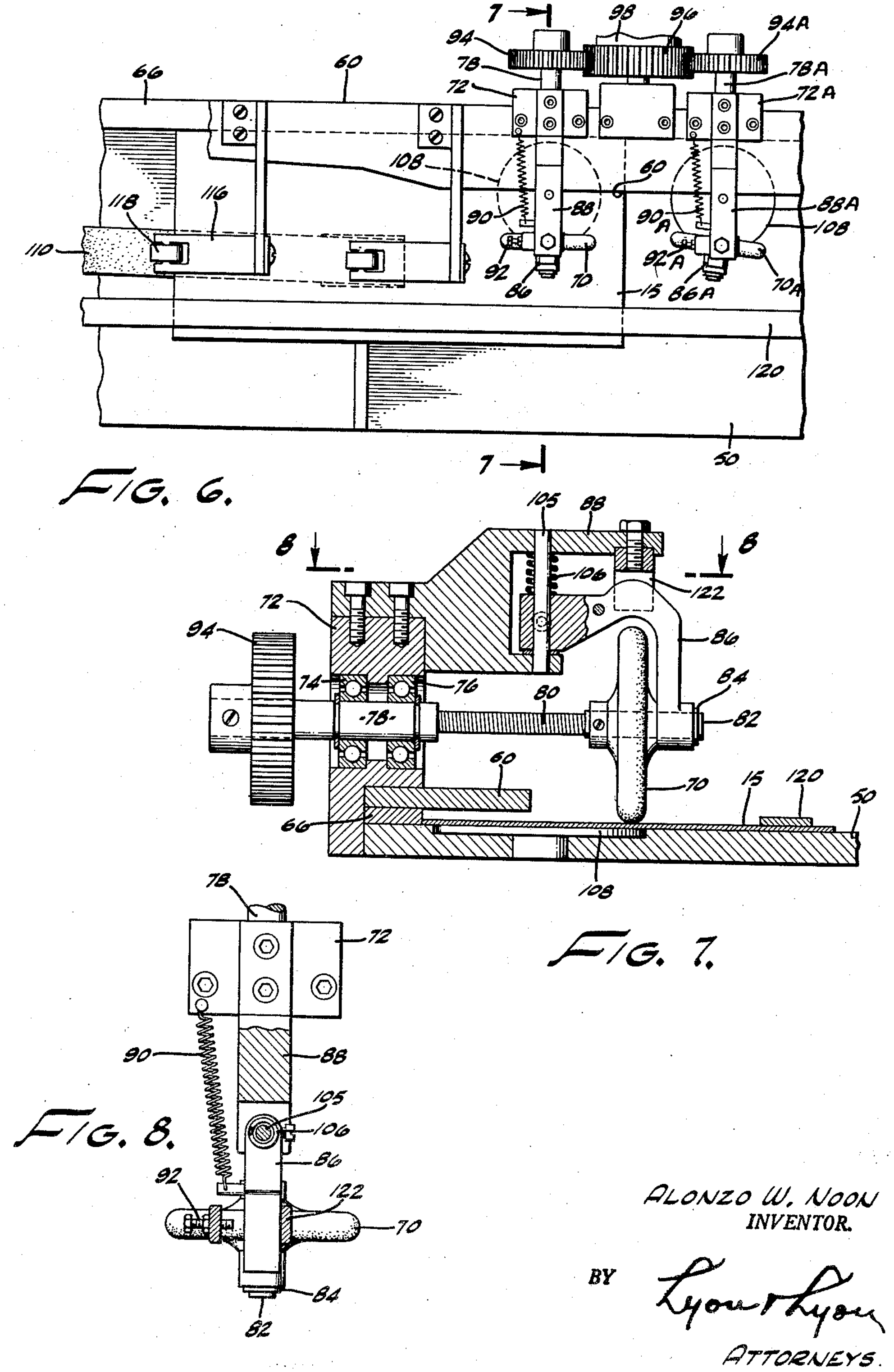
Figure 6 shows the details of the aligning mechanism in elevation.
Figure 7 is cross section of one of the aligning wheels taken along the line 7—7 in Figure 6.
Figure 8 is a view in elevation and cross section of the aligning wheel taken along the line 8—8 in Figure 7.

The guide plate 60 is spaced above the bedplate 50 a sufficient distance to permit the card to freely slide thereunder along the bedplate. Referring to Figure 6, at one edge of the bedplate and between the bedplate and the guide plate, a metal aligning strip 66 is inserted which has its inner edge accurately ground to form an aligning edge. The guide plate 60 and bedplate 50 serve to sandwich and hold this aligning strip 66. The card 15 is delivered from the drum on to the bedplate and comes under two aligning wheels 70, 70A, which are similar in construction and therefore only one of them will be described. These aligning wheels, however, are spaced a short distance apart to complement each other in aligning the card. A bearing block 72, 72A as shown in Figures 6, 7, and 8 is secured to the guide plate 60. Projecting through said block and rotating in two ball bearings 74, 76 is a short shaft 78. Extending inwardly from said short shaft is a flexible shaft 80. As shown, the wheel 70 is mounted on a stub shaft 82 carried in a bearing 84 in an arm 86. The arm 86 is pivotally mounted in the supporting yoke 88, which is also carried by the bearing block 72. A tension spring 90 serves to pull the arm 86 against a stop 92 so that the wheel 70 normally is angled towards the aligning edge 66. A gear 94 is carried by the short shaft 78 to drive the wheels 70, 70A which are thus geared to be driven by a gear 96 which, in turn, is driven from a pulley 98. A motor 100, as shown in Figures 1 and 2, applies the driving force via belts 102, 104 to both the drum and the aligning units. The arm 86 of the aligning units can move in a vertical direction also, since a pin 105 which supports the arm is mounted in the yoke and permits the arm to slide vertically therealong. However, the arm is normally pushed downward by a spring 106 so that the wheel 70, which has a tire of rubber or some other friction material, bears against a round insert 108. This round insert 108 is mounted within a hole in the bedplate so that its surface is flush with the surface of the bedplate. It is also supported to be free to be rotationally driven in a horizontal plane by the rotating wheel.

Also shown in Figures 1 and 2 is a drive belt 110 which is endless and travels around two pulleys 112, 114 placed under the bedplate. Tensioning springs 116 having small rotating wheels 118 in the ends thereof, as shown in detail in Figure 5, serve to hold the cards or sheets of flexible material down against the drive belt 110. The drive belt is angled inwardly towards the aligning edge in order to maintain the cards in aligning contact with the aligning strip 66. A pressure spring 120 is attached to the upper guide plate and serves to assist in pressing the cards down on the drive belt.

When a card 15 is released from the drum as previously described, it passes under the guide plate 60 and then under the wheel 70A of the first aligning unit, which is constantly revolving at a peripheral speed equal to or slightly greater than that of the drum. In view of the spring 90 which angles the wheel toward the aligning edge, the card is driven in that direction as it progresses over the bedplate 50. When the edge of the card strikes the aligning strip 66 so that it can no longer have any sidewise movement, a force is set up which causes the wheel of the aligning unit to pivot back against a backstop 122, shown in Figure 7, so that the wheel now lines up with the direction of travel of the card along the bedplate. The wheel then drives the card forward with no sidewise component.

The second aligning mechanism functions similarly to drive the card over against the aligning edge and forward along the bedplate. It serves to complete the operation of the first aligning mechanism. The card is then picked up by the drive belt 110. The surface speed of the drive belt is equal to or slightly greater than the peripheral speed of the wheel. The surface of the drive belt is slightly above that of the bedplate. Since the drive belt is angled inwardly toward the aligning edge, in carrying the card forward, it serves to hold the card firmly against the aligning edge at all times. Also, it serves to make any small corrections in alignment which have not been made by the previous two aligning mechanisms. The cards are thus delivered to the end of the belt uniformly spaced from one another and in perfect alignment by one edge.

Thus there has been shown and described a mechanism for picking up cards, checks, sheets of flexible material, and the like from a stack and carrying them to a subsequent operation singly and in accurately aligned fashion. Of course, there must be determined in advance by which edge these cards are to be aligned and they must be placed in the elevator mechanism in such fashion that these are the edges which will be presented to the aligning strip when the bedplate is reached. At the end of the drive belt the cards are delivered singly and accurately aligned to a station where any subsequent operation which is desired may be performed thereon.

There has been described and shown herein a novel and useful apparatus for separating flexible sheets from a stack and delivering them singly and in accurately aligned sequence to a subsequent operating station.

I claim:

1. Apparatus for accurately aligning sheets of flexible material and the like to which said sheets are fed comprising an elongated bedplate having an aligning edge along one side, aligning means to which said sheets are fed including a wheel, means to mount said wheel to have its periphery yieldably urged toward said bedplate and to be yieldably turnable through an acute angle from a position parallel to said aligning edge while remaining at substantially a right angle to said bedplate, means to rotate said wheel, an opening in said bedplate beneath said wheel, a disc rotatably mounted in said opening in the plane of said bedplate and positioned to be rotatably driven by said wheel, and means to convey each of said sheets over said bedplate along and in aligning contact with said aligning edge.

2. Apparatus for accurately aligning by one edge sheets of flexible material and the like comprising an elongated bedplate having an aligning edge along one side, a guide plate mounted above and parallel to said bedplate, said guide plate being spaced sufficiently from said bedplate to permit one of said sheets to be slidably moved therebetween, aligning means including a bearing block mounted on said guide plate, a wheel, means to support said wheel from said bearing block to have its periphery yieldably urged toward said bedplate and to be yieldably turnable through an acute angle from a position parallel to said aligning edge while remaining at substantially a right angle to said bedplate, means to rotate said wheel, an opening in said bedplate beneath said wheel, a disc rotatably mounted in said opening in the plane of said bedplate and positioned to be rotatably driven by said wheel, and second aligning means including a drive belt, means to rotatably support said drive belt parallel to said bedplate and at an angle to said aligning edge, said drive belt being spaced from said bedplate to have its upper surface between said guide plate and said bedplate.

3. Apparatus as recited in claim 2 wherein said means to support said wheel from said bearing block includes a yoke extending outwardly from said bearing block over said bedplate, an arm supported by said yoke to be rotatable through a limited horizontal angle and movable vertically, said arm extending downwardly from said yoke toward said bedplate, a compression spring mounted between said arm and said yoke to urge said arm toward said bedplate, a bearing carried by said arm, a stub shaft supported by said bearing, said wheel being mounted on said stub shaft, a bearing mounted in said bearing block, a flexible shaft having one end carried by said bearing in said bearing block and the other end mounted in said wheel and a spring connected between said bearing block and one side of said arm to maintain said wheel at an angle with said aligning edge.

4. Apparatus as recited in claim 3 wherein there are two said first aligning means spaced along said bedplate followed by said second aligning means.

5. Apparatus for accurately aligning by one edge sheets of flexible material and the like comprising an elongated bedplate having an aligning edge on one side thereof, a guide plate mounted above and parallel to said bedplate, said guide plate being sufficiently spaced from said bedplate to permit one of said sheets to be slidably moved therebetween, a pair of first aligning means and a second aligning means spaced along said bedplate, each of said pair of first aligning means including a bearing block mounted on said guide plate, a yoke extending substantially parallel to said bedplate from said bearing block and supported thereby, an arm supported by said yoke to be rotatable through a limited angle and movable vertically, said arm extending downwardly from said yoke toward said bedplate, a compression spring mounted between said arm and said yoke to urge said arm toward said bedplate, a first bearing carried by said arm, a stub shaft supported by said first bearing, a wheel having a tire of a frictional material mounted thereon, said wheel being mounted on said stub shaft, a second bearing mounted in said bearing block, a flexible shaft having one end mounted in said second bearing and the other end in said wheel, means to rotate said flexible shaft to rotate said wheel therewith, a spring connected between said bearing block and one side of said arm to yieldably maintain said wheel at an angle with said aligning edge, an opening in said bedplate beneath said wheel, a disc rotatably mounted in said opening in the plane of said bedplate, said arm having a sufficient length to bring said wheel in contact with said disc, said disc having its center positioned to permit its being driven by said wheel, said second aligning means including a drive belt, means to rotatably support said drive belt parallel to said bedplate and at an angle to said aligning edge, said drive belt being spaced from said bedplate to have its carrying surface between said guide plate and said bedplate and a plurality of flat spring means spaced above and along said drive belt and in yielding contact therewith.

References Cited in the file of this patent

UNITED STATES PATENTS

| | | |
|---|---|---|
| 789,746 | Leiger | May 16, 1905 |
| 1,672,412 | Hitchcock | June 5, 1928 |
| 2,114,593 | Donnellan | Apr. 19, 1938 |
| 2,124,855 | Hitchcock | July 26, 1938 |
| 2,165,161 | Spiess | July 4, 1939 |
| 2,181,241 | Klemm | Nov. 28, 1939 |
| 2,184,229 | Spiess | Dec. 19, 1939 |
| 2,300,625 | Martin | Nov. 3, 1942 |
| 2,464,173 | Broadmeyer | Mar. 8, 1949 |
| 2,645,479 | Mitchell | July 14, 1953 |
| 2,669,454 | Babicz | Feb. 16, 1954 |
| 2,674,456 | Gibson | Apr. 6, 1954 |